(12) United States Patent
Lund et al.

(10) Patent No.: US 12,539,019 B2
(45) Date of Patent: Feb. 3, 2026

(54) HANDLE FOR AN ENDOSCOPE (71) Applicant: AMBU A/S, Ballerup (DK)

(72) Inventors: Jesper Grøndahl Lund, Værløse (DK); Bjørn Bruhn Thomsen, Birkerød (DK)

(73) Assignee: AMBU A/S, Ballerup (DK)

( * ) Notice: Subject to any disclaimer, the term of this patent is extended or adjusted under 35 U.S.C. 154(b) by 500 days.

(21) Appl. No.: 17/920,325

(22) PCT Filed: Apr. 21, 2021

(86) PCT No.: PCT/DK2021/050115
§ 371 (c)(1),
(2) Date: Oct. 20, 2022

(87) PCT Pub. No.: WO2021/213598
PCT Pub. Date: Oct. 28, 2021

(65) Prior Publication Data
US 2023/0157519 A1   May 25, 2023

(30) Foreign Application Priority Data

Apr. 24, 2020 (DK) .......................... PA 2020 70256

(51) Int. Cl.
*A61B 1/00* (2006.01)
*A61M 39/10* (2006.01)

(52) U.S. Cl.
CPC ...... *A61B 1/00066* (2013.01); *A61B 1/00048* (2013.01); *A61M 2039/1033* (2013.01)

(58) Field of Classification Search
CPC ............ A61B 1/00064; A61B 1/00066; A61B 1/00071; A61B 1/00078; A61B 1/005;
(Continued)

(56) References Cited

U.S. PATENT DOCUMENTS 4,750,477 A * 6/1988 Wardle .................. A61B 1/307
600/149
5,167,221 A   12/1992 Chikama
(Continued)

FOREIGN PATENT DOCUMENTS

CA      3078145 A1    4/2019
CN      204601276 U   9/2015
(Continued)

OTHER PUBLICATIONS

Examination report in Danish Patent Application No. PA 2020 70257 dated Jul. 31, 2020, 6 pages.
(Continued)

*Primary Examiner* — Ryan N Henderson
(74) *Attorney, Agent, or Firm* — Faegre Drinker Biddle & Reath LLP (57) ABSTRACT

A handle (4) for an endoscope (1) includes a first shell-shaped (6) housing part and a second shell shaped housing part (7) adapted for mutual engagement so as to form a housing. The shell-shaped housing parts (6, 7) include a first recess (10) and a second recess (11) so arranged and configured that when the first and second shell-shaped housing parts (6, 7) are mutually engaged, a circumferential recess is provided in the exterior surface of the housing. The handle (4) further includes a hoop (28) adapted to be received in the circumferential recess and hold the first and second shell-shaped housing parts together.

28 Claims, 8 Drawing Sheets

(58) Field of Classification Search
CPC ... A61B 1/0051; A61B 1/0052; A61B 1/0053; A61B 1/0055; A61B 1/0056; A61B 1/0057; A61B 1/0058; A61M 39/10; A61M 2039/1033
See application file for complete search history.

(56) References Cited

U.S. PATENT DOCUMENTS

| | | | |
|---|---|---|---|
| 5,347,993 A * | 9/1994 | Tanaka | A61B 1/0057 600/109 |
| 5,735,793 A | 4/1998 | Takahashi et al. | |
| 5,885,208 A * | 3/1999 | Moriyama | A61B 1/0051 600/146 |
| 6,814,697 B2 | 11/2004 | Ouchi | |
| 7,833,153 B2 | 11/2010 | Takeuchi et al. | |
| 7,862,504 B2 | 1/2011 | Kura et al. | |
| 8,317,684 B2 | 11/2012 | Matsuo et al. | |
| 9,089,263 B2 | 7/2015 | Maruyama | |
| 9,635,999 B2 | 5/2017 | Fujitani et al. | |
| 10,271,914 B2 | 4/2019 | Nambi et al. | |
| 12,016,524 B2 | 6/2024 | Nguyen et al. | |
| 2007/0238926 A1 | 10/2007 | Boulais | |
| 2008/0119695 A1 | 5/2008 | Ueno et al. | |
| 2008/0275427 A1 | 11/2008 | Sage | |
| 2008/0306469 A1 | 12/2008 | Masuda et al. | |
| 2009/0017115 A1 | 1/2009 | Kaplan et al. | |
| 2009/0171158 A1 | 7/2009 | Matsuo et al. | |
| 2009/0225159 A1 | 9/2009 | Schneider et al. | |
| 2009/0261536 A1 | 10/2009 | Beale et al. | |
| 2010/0249773 A1 | 9/2010 | Clark et al. | |
| 2012/0302835 A1 | 11/2012 | Mathieu et al. | |
| 2013/0060236 A1 * | 3/2013 | Ogle | A61M 25/0136 604/528 |
| 2013/0158521 A1 | 6/2013 | Sobue | |
| 2014/0024896 A1 | 1/2014 | West | |
| 2014/0066790 A1 | 3/2014 | Burkett et al. | |
| 2014/0150782 A1 | 6/2014 | Vazales et al. | |
| 2014/0276326 A1 | 9/2014 | Göllner et al. | |
| 2016/0073857 A1 | 3/2016 | Boutillette et al. | |
| 2016/0113656 A1 | 4/2016 | Privitera et al. | |
| 2017/0010458 A1 | 1/2017 | Nishijima | |
| 2017/0071447 A1 | 3/2017 | Nishiie et al. | |
| 2017/0127910 A1 * | 5/2017 | Asaoka | A61B 1/0057 |
| 2017/0143940 A1 * | 5/2017 | Flygare | A61M 25/0136 |
| 2018/0224037 A1 | 8/2018 | Yamagata | |
| 2018/0250484 A1 | 9/2018 | Mccormick et al. | |
| 2018/0263466 A1 | 9/2018 | Kärcher et al. | |
| 2019/0111238 A1 | 4/2019 | Schultz et al. | |
| 2019/0231179 A1 | 8/2019 | Hansen et al. | |
| 2020/0121167 A1 * | 4/2020 | Araki | G02B 23/24 |
| 2020/0229684 A1 | 7/2020 | Lund et al. | |
| 2020/0315430 A1 | 10/2020 | Ward-Booth et al. | |
| 2020/0345207 A1 * | 11/2020 | Nguyen | A61B 1/0676 |
| 2020/0345209 A1 * | 11/2020 | Whitney | A61B 1/0052 |
| 2021/0212553 A1 | 7/2021 | Appling et al. | |
| 2021/0235973 A1 * | 8/2021 | Gray | A61B 1/00042 |
| 2022/0095893 A1 * | 3/2022 | Weldon | A61B 1/00042 |
| 2022/0280024 A1 * | 9/2022 | Mo | A61B 1/00066 |
| 2023/0301492 A1 | 9/2023 | Kunuki et al. | |
| 2023/0389779 A1 * | 12/2023 | Zhang | A61B 1/00066 |
| 2024/0115118 A1 | 4/2024 | Ailinger et al. | |

FOREIGN PATENT DOCUMENTS

| | | |
|---|---|---|
| CN | 103800053 B | 1/2016 |
| CN | 103800055 B | 1/2016 |
| DE | 202011005365 U1 | 10/2011 |
| EP | 1747797 A1 | 1/2007 |
| EP | 3266365 A1 | 1/2018 |
| EP | 3316957 A1 | 5/2018 |
| EP | 2874533 B1 | 2/2019 |
| EP | 3106078 B1 | 5/2019 |
| KR | 20190112877 A | 10/2019 |
| WO | 2005089851 A1 | 9/2005 |
| WO | 2011140583 A1 | 11/2011 |

OTHER PUBLICATIONS

Examination report in Danish Patent Application No. PA 2020 70256 dated Jul. 17, 2020, 7 pages.
Written opinion in International Application No. PCT/DK2021/050116, dated Jul. 28, 2021, 9 pages.
Written opinion in International Application No. PCT/DK2021/050115, dated Jul. 26, 2021, 9 pages.
SpyScope DSII Catheter brochure, Boston Scientific, launched 2018.
Extended search report in European Patent Application No. 21725381.4, mailed Aug. 8, 2025, 5 pages.

* cited by examiner

HANDLE FOR AN ENDOSCOPE

CROSS REFERENCE TO RELATED APPLICATIONS

This application is a National Stage entry under 35 U.S.C. § 371 of International Application No. PCT/DK2021/050115, filed Apr. 21, 2021, which claims priority from and the benefit of Danish Patent Application No. PA 2020 70256, filed Apr. 24, 2020; said applications are incorporated by reference herein in their entirety.

TECHNICAL FIELD

The present disclosure relates to an endoscope, more specifically but not exclusively a duodenoscope, and in particular to the assembly of the endoscope.

RELATED ART

A duodenoscope is a flexible endoscope configured to access a patient's duodenum from the stomach via the patient's mouth and esophagus. When the tip of the insertion cord is positioned in the duodenum there is a need to guide a tool radially from the tip, e.g. towards the biliary ducts in the wall of the duodenum. For that purpose the camera and the exit of a working channel of a duodenoscope is, unlike many other types of endoscopes, not positioned at the end surface of the distal tip of the endoscope. Instead it is arranged at an angle, typically perpendicular to the lengthwise direction of the insertion cord, but still in close proximity to the distal tip of the endoscope. Moreover, in order to accommodate different needs for guiding the tool the exit port of the working channel is provided with a lever that is operated by pulling and pushing a wire connected to an operating member at the endoscope handle. The lever or tool lift is also known as an Albarran mechanism from the original inventor. The Albarran mechanism is essentially a hinged arm arranged in its inactive position as an extension of the wall of the working channel from the exit port on one side thereof. The hinge is in close proximity to the exit port and so arranged that, when activated, the arm or a similar lifting piece may swing in front of the exit port and divert the tool into the field of view of the camera, i.e. also in a direction at an angle, preferably perpendicular, to the longitudinal direction of the insertion cord. An example of such an arrangement is disclosed in U.S. Pat. No. 9,089,263.

As will be understood, a duodenoscope is a specialized or dedicated endoscope, and many features that will be referred to may be applicable to endoscopes in general and not just duodenoscopes. In this description it is to be understood that when reference is made to endoscopes in general it is to be understood as likewise referring to a duodenocope, i.e. a duodenoscope comprising when features applicable to endoscopes in general.

When the endoscope is inserted into a patient via the mouth, oral cavity, esophagus and the stomach, the insertion cord is advanced via a series of twist and turns and advances. For this the distal end of the insertion cord of the endoscope comprises a bending section comprising a series of articulated segments of which the tip part with the camera and the exit port form the distalmost segment. The bending section is controlled by one or more levers or wheels on the handle of the endoscope, allowing the operator to bend the bending section to a desired curvature in one or more directions. For duodenoscopes there are typically two levers for controlling four directions of bending, i.e. what would normally be referred to as left, right, up and down if the view of the camera were forward from the distal end. When, however, the view of the camera is not forward, e.g. in a duodenoscope the operator does not have this left, right, up, down sense from the camera view and the corresponding motions of the handle necessary in conjunction with the bending, turning and advancing are much less intuitive. It is therefore important that the position of the camera, i.e. the field of view thereof, is well known and precise with respect to the handle.

An endoscope is assembled from many separate parts and subassemblies, including one or more handle parts and an insertion tube forming the majority of the insertion cord. In view of the above it is therefore of importance to keep track of the orientation of the insertion tube with the camera with respect to the handle parts, e.g. housing shells, when assembling the insertion tube including the camera and other parts with the handle housing.

The insertion tube typically comprises a helically wound member preventing the insertion tube from kinking or otherwise collapsing, while still allowing the insertion tube with a flexibility, so as to allow it to adapt to and follow the tortuous insertion passage through the body cavities, e.g. the path mentioned above through mount, oral cavity esophagus, stomach, and duodenum. The helically wound member is normally covered with further layers, such as braids and sealing outer layers. An endoscope with such an insertion tube is disclosed in US2009/0171158.

In US2009/0171158 the proximal end of the insertion tube is terminated within the handle of the endoscope using an arrangement comprising multiple mouth rings and other parts secured to one another by welding, crimping and by means of screws. In a few embodiments the welding is omitted, and instead an externally threaded mouth ring matching the pitch and dimensions of the helically would member is screwed into the helically wound member. This in turn is secured to a second, outer mouth ring by plastic deformation of the latter. The second outer mouth ring is, in turn, secured to one of multiple linkage members within the handle of the endoscope, by means of screws.

In KR20190112877 the proximal end of the insertion tube of the insertion cord of a duodenoscope is terminated in an intermediate handle part that can releasably be secured against rotation by pressing it against the remainder of the handle housing by means of a tightening ring. The tightening ring has an internal thread that engages an external thread formed in a transition part formed by two housing shell parts. No details are disclosed on how the insertion tube part of the insertion cord is itself secured in the intermediate part.

Trends in medical endoscopes and in particular duodenoscopes are going towards disposable endoscopes, i.e. endoscopes for single use on one patient only, before they are disposed of. The costs therefore need to be kept down, as compared to traditional reusable endoscopes that cleaned and sterilized between uses on different patients.

The parts therefore must be low cost and assembly of the parts efficient. The rather complex arrangements of US2009/0171158 do not lend themselves to this. Moreover, US2009/0171158 appears to be a forward looking endoscope and there are no considerations regarding the angular orientation of the insertion tube with respect to the handle.

As for the insertion tube, a desired length is normally cut from a longer length of prefabricated tube comprising e.g. the helically wound member, the braided layer and the outer sealing layer. Cutting such a prefabricated tube in a manner where the cuts of the helically wound member are located in a precise manner with respect to the circumference of the insertion tube, i.e. angular location, is difficult.

BRIEF DESCRIPTION OF THE DISCLOSURE

On this background it is the object of the disclosure to provide an endoscope, in particular but not exclusively, a duodenoscope, with a construction using few and low-cost parts, and at the same time the renders itself for easy and efficient assembly.

According to a first aspect of the disclosure this is achieved by a handle for an endoscope, said handle having a proximal end and a distal end, and said handle comprising a first shell-shaped housing part and a second shell shaped housing part, where said first shell shaped part and said second shell-shaped part are adapted for mutual engagement so as to form a housing, characterized in that said first shell-shaped housing part and said second shell-shaped housing each comprise an outer surface adapted to form together an exterior surface of said housing, wherein a first recess is provided in said first outer surface of said first shell-shaped housing part and wherein a second recess is provided in the second outer surface of the second outer shell-shaped housing part, said first and second recesses being so arranged and configured that when the first and second shell-shaped housing parts are mutually engaged an annular circumferential recess is provided in the exterior surface of the housing, and in that said handle further comprises a hoop adapted to be received in said annular circumferential recess and hold said first and second shell-shaped housing parts together.

According to a second aspect of the disclosure, the object is achieved in by the use of a hoop in holding a first shell-shaped housing part and a second shell-shaped housing part of an endoscope together.

According to a third aspect of the disclosure, the object is achieved by a system comprising an endoscope according to the first aspect of the disclosure and a display unit connectable to said endoscope.

According to a preferred embodiment of the first aspect of the disclosure, the annular circumferential recess has a bottom with a taper towards the distal end of the handle. This allows the hoop to be easily slid over the shell-shaped housing parts and engage into the annular circumferential recess.

According to a further preferred embodiment of the first aspect of the disclosure, the bottom of the annular circumferential recess comprises a frusto-conical surface. This ensures good engagement between the surfaces and ensures that hardly any gaps where pollutants may accumulate during the use of the endoscope exist.

According to another preferred embodiment, at least one of said first or second shell-shaped member comprises an interior surface, where said interior surface is adapted to receive and secure in position with respect to said interior surface a coupling member for an insertion tube of the endoscope. This allows the easy mounting of an insertion cord sub-assembly which will then be held securely in position by the handle housing parts.

According to yet another preferred embodiment, the coupling member is secured against rotation with respect to the handle in a longitudinal direction from the proximal end to the distal end of the handle. This is advantageous when the endoscope is not a forward looking endoscope.

BRIEF DESCRIPTION OF THE FIGURES

The disclosure will now be made in greater detail based on non-limiting exemplary embodiments and with reference to the drawings on which.

DETAILED DESCRIPTION

Figure 1:
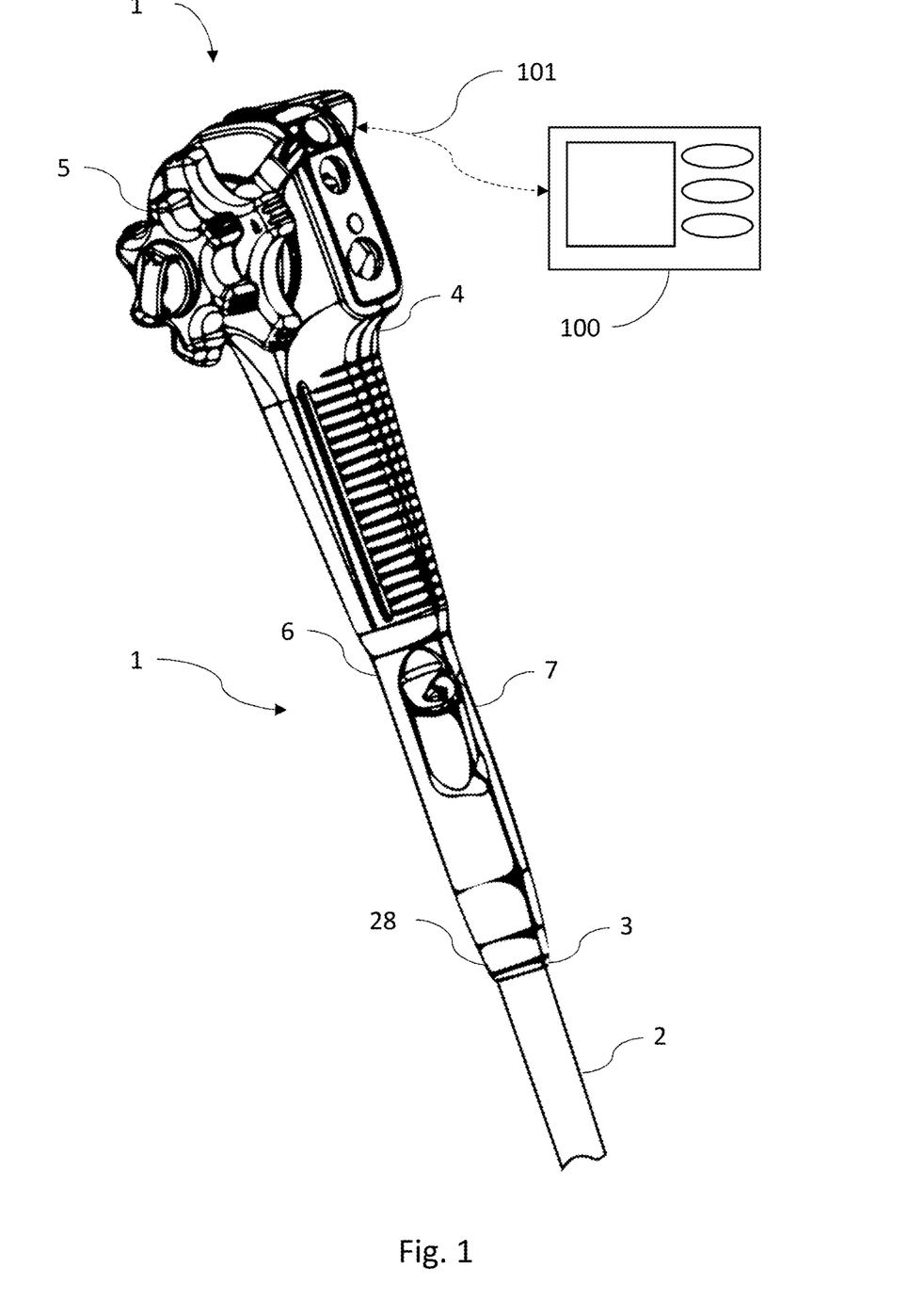
FIG. 1 shows as system comprising an endoscope according to the disclosure and a display unit.

Turning first to FIG. 1, a system comprising a medical device, such as an endoscope, more specifically a duodenoscope 1, and a display unit 100 is shown. The endoscope comprises an insertion cord with an insertion tube 2 extending from the distal end 3 of the handle 4. For illustration purposes the distal end of the insertion cord has been omitted. At or close to the proximal end of the handle operating members such as rotary knobs 5 are located.

Figure 2:
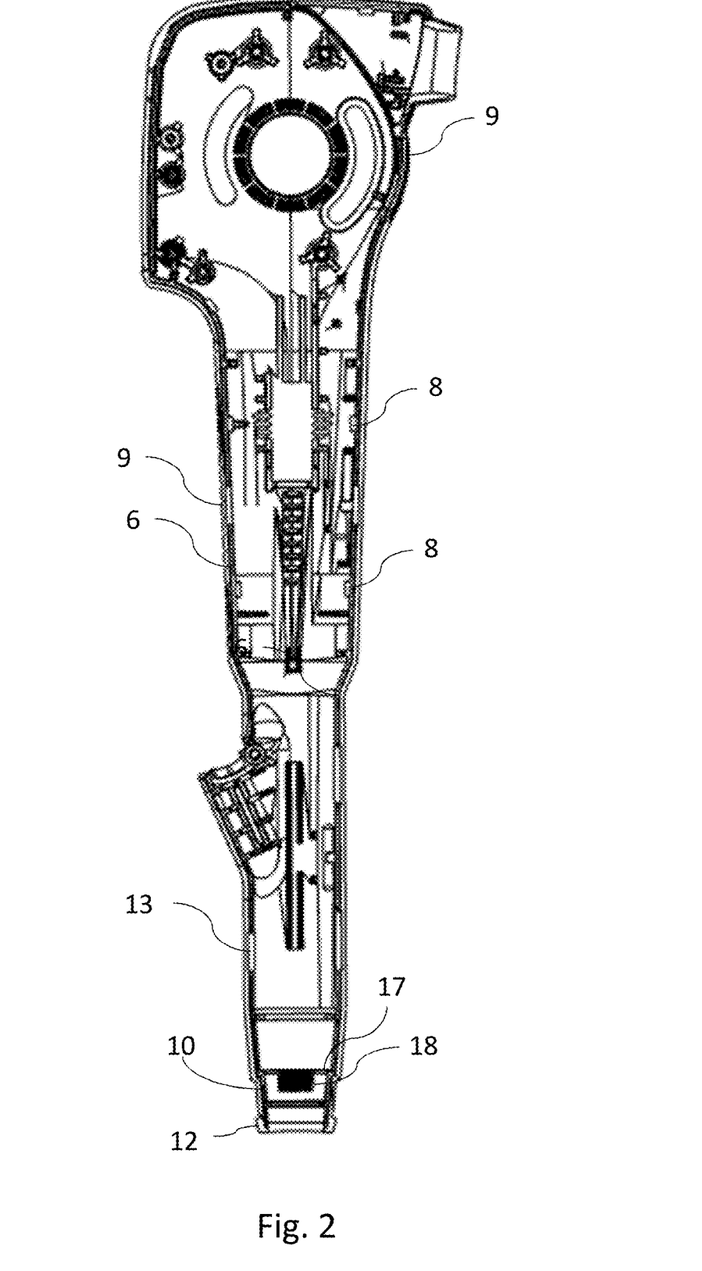
FIG. 2 shows a first handle housing part for the endoscope.
Figure 3:
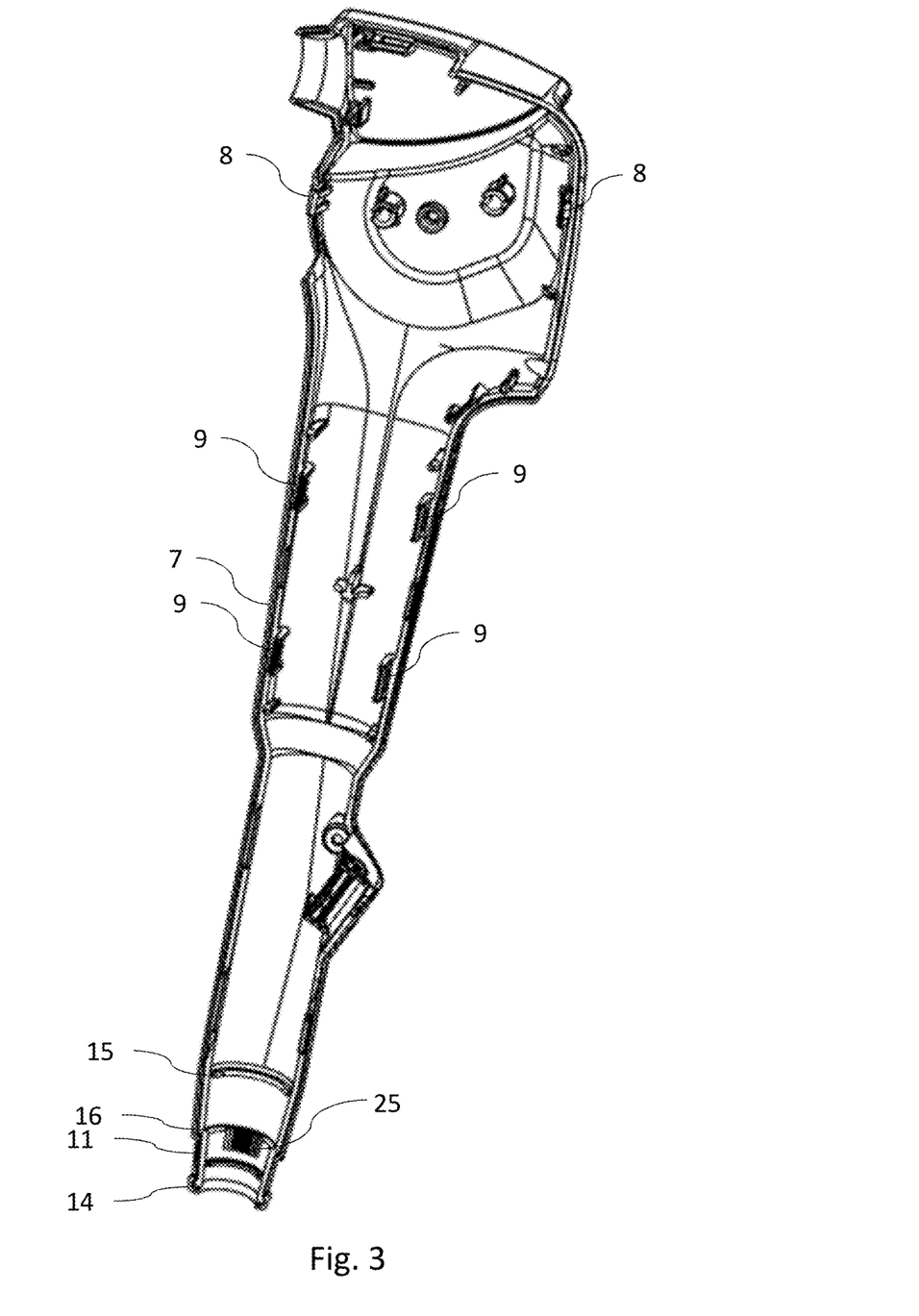
FIG. 3 shows a second handle housing part for the endoscope.

As can be seen from FIGS. 2 and 3, the handle comprises two matching shell-shaped parts, i.e. a first handle housing part 6 and a second handle housing part 7 which when joined form exterior of the handle 4 protecting the internal parts (not shown). For the joining and mutually securing of the first and second handle parts 6, 7, they may comprise mutually engaging locking members such as barbs 8 and lugs 9 adapted to interlock the two housing parts, so as to form the majority of the handle housing. Each of the shell-shaped first and second handle housing parts 6, 7 comprise an interior surface and an exterior surface, as defined by the assembled handle, i.e. so that the essentially convex surface of each shell-shaped handle housing part 6, 7 together provide the exterior surface of the assembled handle 4.

Figure 4:
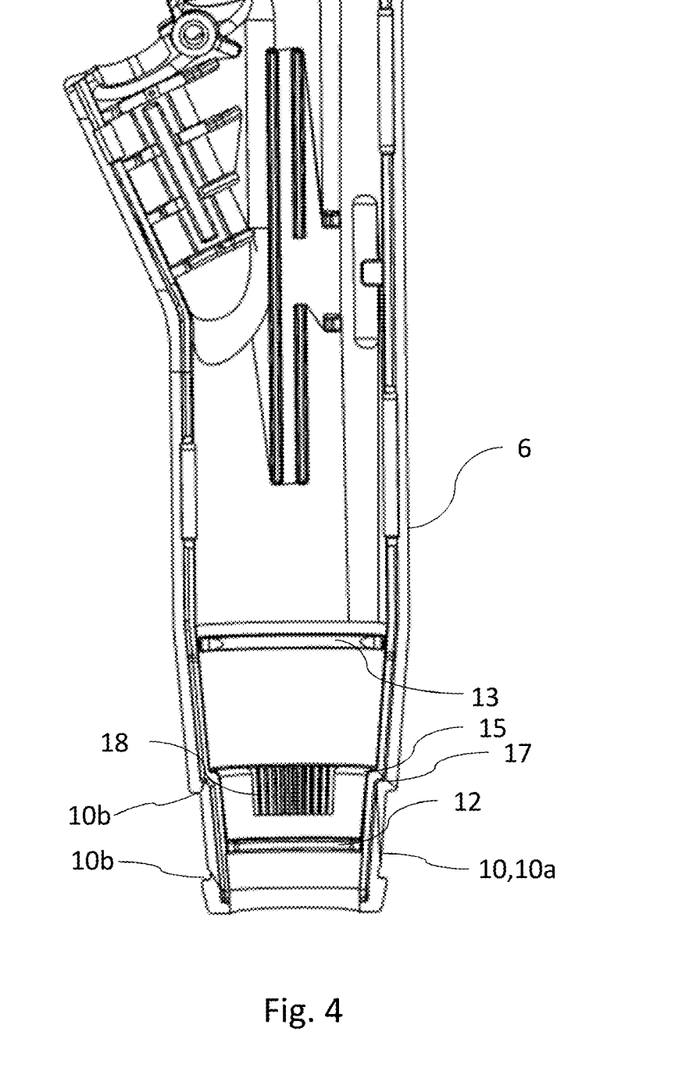
FIG. 4 shows a detail of the distal end of the handle housing part of FIG. 2.

In FIG. 4 the distal end of the first handle housing part 6 is shown in greater detail. As can be seen the first handle housing part 6 has a taper towards the distal end of the handle. In the external surface of the tapered part a recess 10 is provided, which, together with a corresponding recess 11 in the external surface of the second handle housing part 7, form a circumferential groove such as an annular recess when the first handle housing part 6 and the second handle housing part 7 are joined. On the interior surface of the first handle housing part 6 a first semicircular rib 12 and a second semicircular rib 13 are formed. Between the first and second semicircular ribs 12, 13 a shoulder 17 or ledge is provided. Adjacent the shoulder 17 a number of teeth 18 protruding from the interior wall of the first handle housing part 6 are provided.

Likewise, as can be seen in FIG. 3, on the interior surface of the second handle housing part 7 a third semicircular rib 14 and a fourth semicircular rib 15 are formed. Between the third and fourth semicircular ribs 14, 15 a shoulder 16 or ledge is provided. Adjacent the shoulder 16 a number of teeth 25 protruding from the interior wall of the second handle housing part 7 are provided.

Figure 5:
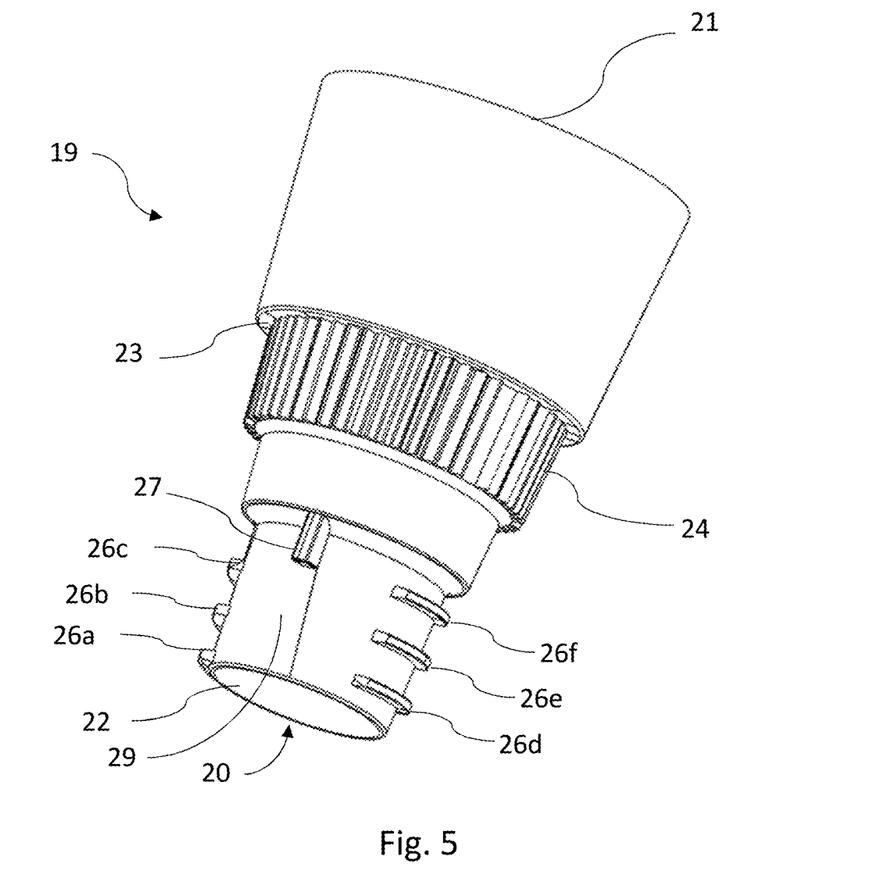
FIG. 5 shows a coupling member according to the disclosure

The first and second semicircular ribs 12, 13 together with the interior wall of the first handle housing part 6 form part of a receptacle for a coupling member 19 shown in FIG. 5.

The coupling member 19 provides a simple and cost-efficient way of assembling the insertion cord with the handle 4 of the endoscope 1.

Figure 6:
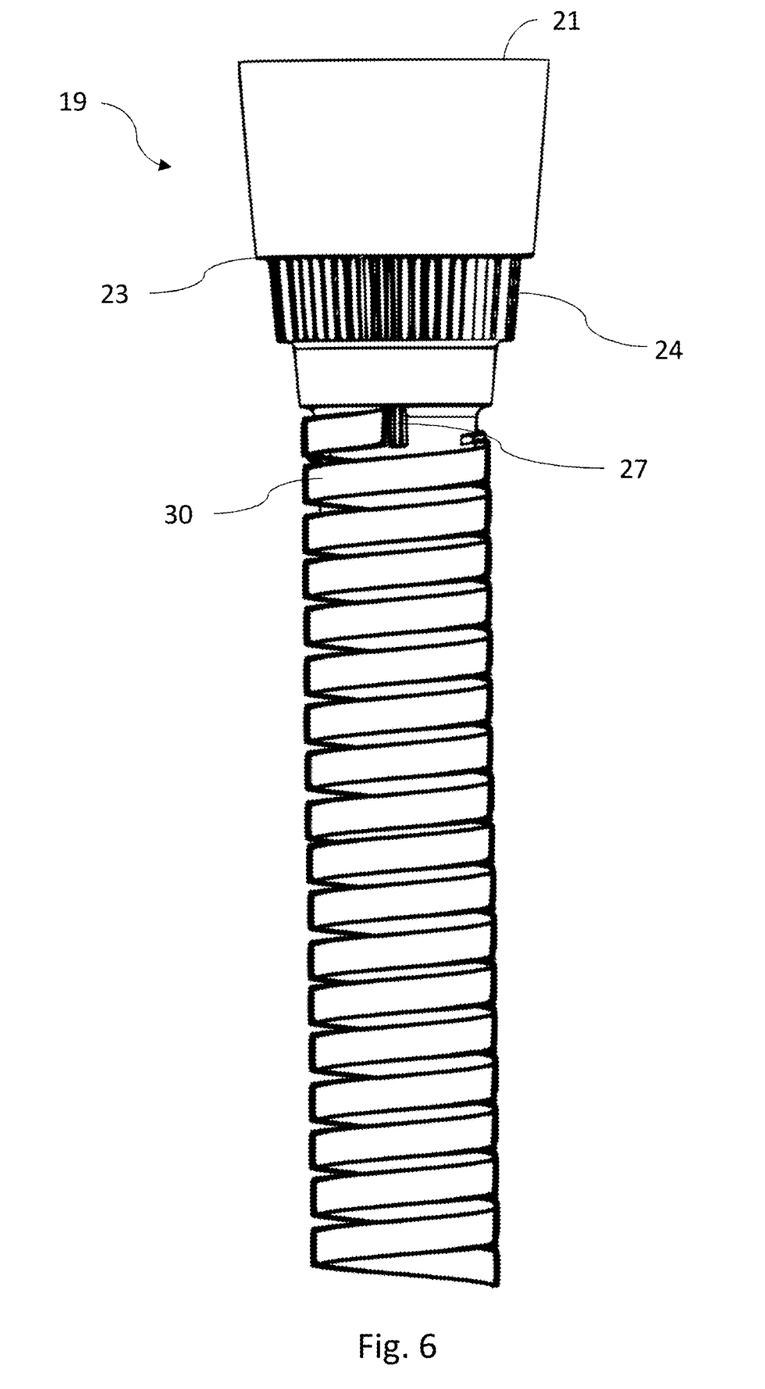
FIG. 6 shows how the coupling member engages a wound helical member of the insertion tube.
Figure 9:
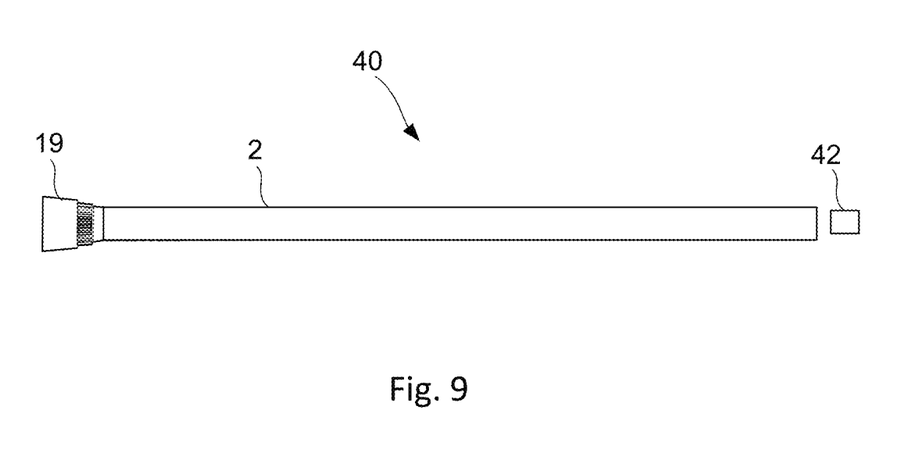
FIG. 9 shows an sub-assembly including the coupling member of FIG. 7 and the insertion tube of FIG. 6.

The coupling member 19 comprises a generally tubular member with a through passage 20 from the proximal end 21 towards the distal end 22. The circumference at the proximal end 21 is larger than at the distal end 22 so that the coupling member generally has a taper towards the distal end 22. As can be seen, the taper is not smooth but comprises at least one shoulder 23 adapted to match the shoulder 17 in the first handle housing part 6 and a corresponding shoulder 16 in the second handle part 7. Also, the coupling member comprises a number of teeth 24 arranged circumferentially around a mid-section of the coupling member 19 (a second sector of the coupling member 19) adjacent the shoulder 23. The teeth 24 are so located and distributed that at least some of them will engage between the teeth 18 in the first handle housing part 6 or a corresponding set of teeth 25 on the second handle housing part 7. Towards the distal end 22 the coupling member 19 comprises a cylindrical or preferably frusto-conical part (a first sector of the coupling member 19) 29 which is provided with an external thread 26a-26f adapted to engage between the windings of a wound helical member forming part of the wall of the insertion tube 2. Using the external thread 26a-26f the coupling member 19 may be screwed into the proximal end of the wall of the insertion tube 2 to form an insertion cord sub-assembly 40 including the insertion tube 2 and a camera 42, as seen in FIG. 9. The part 29 is preferably frusto-conical in order to expand the wound helical member 30 slightly, when it is screwed into the latter, as mentioned above and shown in FIG. 6, so as to increase the force between the coupling member 19 and the insertion tube 2 holding them together. The external thread 26a-26f may be continuous or, as shown, segmented. Glue may be added to ensure that the insertion tube 2 remains in position on the coupling member 19. Preferably the thread 26a-26f is therefore segmented, so as to allow glue to be located in the gaps between the segments and form a glue bond between the coupling member 19 and the insertion tube 2 so as to hold them even better together. Optionally, the coupling member 19 may comprise and end stop 27 preventing it from being screwed too far into the insertion tube 2.

Figure 7:
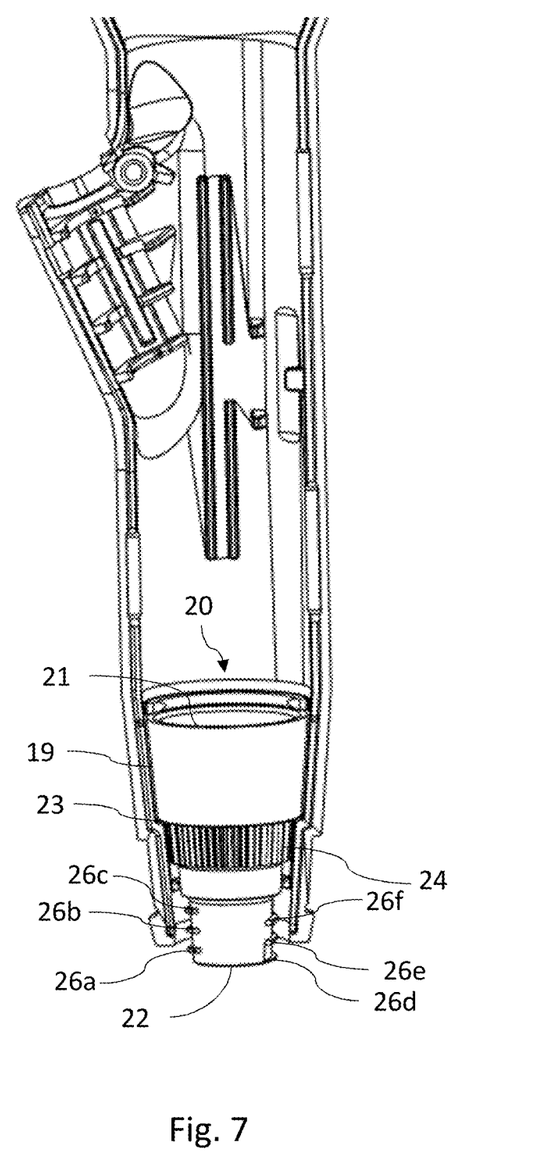
FIG. 7 shows an elevated view of the coupling member placed in position in the first handle housing part.

The insertion cord sub-assembly may then be placed in the receptacle where shoulder 23 and the surface of the proximal end will engage the shoulder 17 and semicircular rib 13 and secure the insertion cord sub-assembly in the longitudinal direction with respect to the handle 4. The rotational orientation of the insertion cord sub-assembly with respect to the first handle housing part 6 may then be checked and adjusted. This is preferably done using the camera 42 in the distal end of the insertion cord sub-assembly. If adjustment is not correct, the insertion cord sub-assembly may be turned so that the engagement between the teeth 18 in the first handle housing part and the teeth 24 on the coupling member 19 changes. When eventually the correct rotational position is reached, the final position of the insertion cord sub-assembly may be secured by attaching the second handle housing part 7 to the first handle housing part 6 whereby the teeth 25 of the second handle housing part 7 also engage and secure the teeth 24 of the coupling member 19.

Using the camera for the verification of the rotational position is advantageous in the sense the camera, being the single most costly part of the endoscope, needs to be checked one or more times during the assembly process anyway in order to replace it if defective, rather than rejecting the final endoscope.

Evidently, the use of engaging teeth 18, 24 and 25 is not the only way to secure against rotation, in principle any kind of interlocking geometries may be used. Using engaging teeth 18, 24 and 25, however allows for sufficiently small discrete angular steps to achieve sufficient precision. Similarly, the preferably semicircular ribs 12-15 need not be semicircular. In principle any protrusion or other discontinuity on the interior surface of the handle housing parts 6, 7 that will prevent longitudinal displacement of the coupling member 19, and hence the subassembly will suffice. However, semicircular ribs 12-15 forming together essentially two full circular ribs will provide maximum strength and hold for a given thickness of the ribs 12-15. The given thickness of the ribs 12-15 on the other hand is largely determined by thickness of the walls of the respective handle housing part 6, 7 because of the aim to keep material thicknesses equal throughout the moulded items to facilitate the moulding process. That is to say, the widths of the ribs 12-15 essentially correspond to the wall thickness of the first and second handle housing parts 6, 7.

Figure 8:
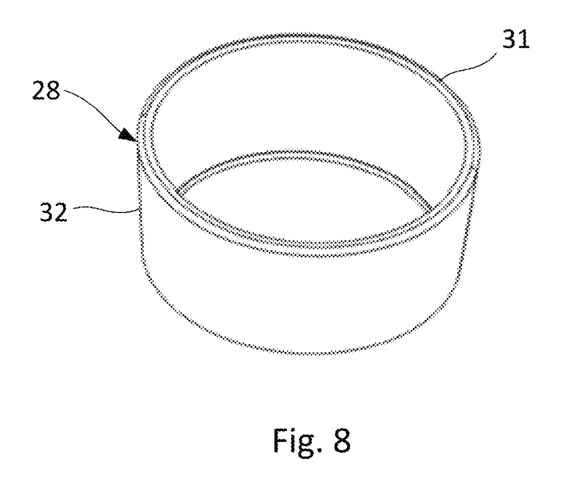
FIG. 8 shows a third handle housing member for securing the first and second handle housing parts and the coupling member.

With the subassembly in place in the correct orientation with respect to the first shell-shaped handle housing part 6, the subassembly is secured by the joining of the first and second handle housing parts 6, 7. In doing so the mutual locking means 8, 9 engage and interlock the first and second shell-shaped handle housing parts 6, 7. Other mutual locking means than those exemplified are of course known to the skilled person. However, since the insertion tube 2 forming part of the insertion cord subassembly extends a substantial distance from the distal end of the handle 4 there will in use be substantial forces acting upon the coupling member 19. The forces will transmit through the coupling member 19 and essentially try to pry the first and second handle housing parts 6, 7 apart. The two handle housing parts 6, 7 are therefore secured against each other not only by means of interlocking members 8, 9 but further by a third handle housing part in the form of a hoop 28 arranged externally on the first and second handle housing parts 6, 7 and serving as a locking ring. The hoop 28 is essentially an annular member with a frusto-conical shape, preferably both on the inner surface 31 and on the outer surface 32. The hoop 28 is made from a material with sufficient tensile strength to withstand the forces transmitted from the coupling member 19 via the handle housing parts 6, 7. However, the hoop 28 has some elasticity as do the handle housing parts 6, 7 thereby allowing the hoop 28 to be slid over the insertion tube 2 and the tapered distal end part of the handle 4 into the annular recess 10a formed by the recesses 10, 11 and delimited by proximal and distal annular shoulders 10b. The recesses 10, 11 are adapted to match the varying inner circumference of the hoop 28, i.e. also have a taper, and the width of the recesses match the height of the hoop 28 to leave as small gaps as possible between the hoop 28 and the annular shoulders 10b of the handle 4. The bottom of the groove or complete recess comprising the recesses 10 and 11 preferably comprises a frusto-conical surface, but it is of course not excluded that it may be slightly convex or concave, in which case the inner surface 31 of the hoop 28 would preferably have a matching shape. Similarly, the outer surface 32 of the hoop 28 is adapted to match the taper of the distal end of the handle 4, so as to provide as smooth an outer surface of the handle 4 as possible.

The location of the recesses 10, 11 preferably register with the coupling member 19, more specifically with the cylindrical or preferably frusto-conical part 29 which is provided with the external thread 26*a*-26*f* of the coupling member 19. This is the narrowest part of the coupling member 19 and allows one side of the recesses 10, 11, respectively to be provided in conjunction with the shoulder 17, in turn keeping the wall thickness of the handle housing parts 6, 7 more or less constant for the above-mentioned moulding reasons.

What is claimed is:

1. An endoscope comprising:
    a handle having a proximal end, a distal end, a first shell-shaped housing part and a second shell-shaped housing part, the first shell-shaped housing part comprising a first outer surface having a first recess, the second shell-shaped housing part comprising a second outer surface having a second recess, the first shell-shaped part and the second shell-shaped part forming a housing comprising an interior surface having teeth, and the first outer surface and the second outer surface forming an exterior surface of the housing;
    a coupling member having teeth, and
    a hoop,
    wherein the first shell-shaped housing part and the second shell shaped housing part extend longitudinally from the proximal end to the distal end of the handle,
    wherein the first recess is located at the distal end of the first shell-shaped housing part and is delimited by a proximal arcuate shoulder and a distal arcuate shoulder,
    wherein the second recess is located at the distal end of the second shell-shaped housing part and is delimited by a proximal arcuate shoulder and a distal arcuate shoulder,
    wherein the first recess and the second recess form an annular recess in the exterior surface of the housing, the annular recess being delimited by a proximal annular shoulder and a distal annular shoulder, the proximal annular shoulder being formed by the proximal arcuate shoulder of the first shell-shaped housing part and by the proximal arcuate shoulder of the second shell-shaped housing part, and the distal annular shoulder being formed by the distal arcuate shoulder of the first shell-shaped housing part and by the distal arcuate shoulder of the second shell-shaped housing part,
    wherein the hoop is received in the annular recess to hold together the first shell-shaped housing part and the second shell-shaped housing part, and
    wherein when the first shell-shaped housing part and the second shell-shaped housing part are held together by the hoop the teeth of the coupling member engage the teeth of the interior surface to secure the coupling member against rotation.

2. The endoscope of claim 1, wherein the annular recess has a bottom with a taper towards the distal end of the handle.

3. The endoscope of claim 2, wherein the bottom comprises a frusto-conical surface.

4. The endoscope of claim 2, wherein at least one of the first shell-shaped part or the second shell-shaped part comprises an interior surface configured to receive and secure a coupling member to attach an insertion tube of the endoscope.

5. The endoscope of claim 1, wherein at least one of the first shell-shaped part or the second shell-shaped part comprises an interior surface configured to receive and secure a coupling member to attach an insertion tube of the endoscope.

6. The endoscope of claim 5, further comprising the insertion tube and the coupling member, wherein the coupling member couples the insertion tube to the housing.

7. The endoscope of claim 6, wherein the coupling member is secured against rotation with respect to the handle.

8. An endoscope comprising:
    a handle having a proximal end, a distal end, a first shell-shaped housing part and a second shell-shaped housing part, the first shell-shaped housing part comprising a first outer surface having a first recess, the second shell-shaped housing part comprising a second outer surface having a second recess, the first shell-shaped part and the second shell-shaped part forming a housing, and the first outer surface and the second outer surface forming an exterior surface of the housing;
    a hoop; and
    a coupling member having teeth,
    wherein the first recess and the second recess form an annular recess in the exterior surface of the housing, the annular recess being delimited by a proximal annular shoulder and a distal annular shoulder,
    wherein the hoop is received in the annular recess to hold together the first shell-shaped housing part and the second shell-shaped housing part,
    wherein the housing comprises an interior surface having teeth, and
    wherein when the first shell-shaped housing part and the second shell-shaped housing part are held together by the hoop the teeth of the coupling member engage the teeth of the interior surface to secure the coupling member against rotation.

9. The endoscope of claim 8, wherein the coupling member includes a coupling member shoulder adjacent and proximal of the teeth of the coupling member, wherein the interior surface includes a first shoulder adjacent and proximal of the teeth of the interior surface, and wherein the first shoulder engages the coupling member shoulder to prevent longitudinal movement of the coupling member in the housing in at least one direction.

10. The endoscope of claim 8, further comprising an insertion tube having an internal winding at a proximal end thereof, wherein the coupling member includes an external thread at a distal end thereof, and wherein the external thread threads onto the internal winding to secure the insertion tube to the coupling member.

11. The endoscope of claim 10, wherein the distal end of the coupling member has a frusto-conical external surface, and wherein the external thread extends from the frusto-conical external surface.

12. The endoscope of claim 8, wherein the coupling member includes: a proximal end having an opening and a distal end having an opening, a passage between the opening in the proximal end and the opening in the distal end, a circumferential wall surrounding the passage and defining an outer circumferential surface between the proximal end and the distal end, wherein the outer circumferential surface comprises a first sector and a second sector, wherein the first sector is closer to the distal end than the second sector and comprises a thread adapted to engage an inside of a wound helical member of an insertion tube, and wherein the second sector includes the teeth.

13. The endoscope of claim 12, further comprising the insertion tube, wherein a wound helical member of the insertion tube is engaged by the thread of the coupling member to secure the insertion tube to the handle.

14. The endoscope of claim 13, the coupling member further comprising an end stop formed by a protrusion extending from the first sector, the end stop abutting a proximal end of the wound helical member of the insertion tube.

15. A visualization system comprising:
an endoscope according to claim 8; and
a display unit connectable to the endoscope.

16. The visualization system of claim 15, wherein the endoscope includes an image sensor operable to generate video signals, wherein the display unit includes a display screen, and wherein the display unit is configured to present with the display screen video images corresponding to the video signals.

17. A method for assembling the endoscope of claim 8, said method comprising:
positioning the coupling member between the first shell-shaped housing part and the second shell-shaped housing part in a desired rotational orientation; and
after positioning the coupling member, positioning the hoop in the annular recess to hold together the first shell-shaped housing part and the second shell-shaped housing part.

18. The method of claim 17, wherein the coupling member comprises:
a proximal end having an opening and a distal end having an opening;
a passage between the opening in the proximal end and the opening in the distal end;
a circumferential wall surrounding the passage and defining an outer circumferential surface between the proximal end and the distal end, the outer circumferential surface comprising a first sector and a second sector, the first sector being closer to the distal end than the second sector and comprising a thread adapted to engage an inside of a wound helical member of an insertion tube, the second sector comprising the teeth.

19. The method of claim 18, further comprising, before positioning the coupling member between the first shell-shaped housing part and the second shell-shaped housing part,
assembling a sub-assembly comprising the insertion tube and a camera, and threading the inside of the wound helical member onto the thread to secure the insertion tube to the coupling member.

20. The method of claim 19, further comprising, using the camera, verifying that the sub-assembly is in the desired rotational orientation, and subsequently positioning the hoop in the annular recess to hold together the first shell-shaped housing part and the second shell-shaped housing part.

21. The method of claim 19, wherein a proximal end of the wound helical member is positioned at the distal end of the handle between distal ends of the first shell-shaped housing part and the second shell-shaped housing part.

22. The method of claim 17, wherein positioning the hoop in the annular recess comprises expanding the hoop, sliding the hoop proximally over the distal annular shoulder, and then releasing the hoop.

23. The endoscope of claim 8, wherein the annular recess comprises a frusto-conical surface tapered toward the distal end of the handle.

24. The endoscope of claim 8, further comprising an insertion tube, wherein the coupling member couples the insertion tube to the housing.

25. The endoscope of claim 24, wherein the hoop comprises an inner diameter, wherein the distal annular shoulder comprises an outer diameter larger than the inner diameter, and wherein the hoop is sufficiently expandable to fit over the distal annular shoulder during assembly.

26. The endoscope of claim 1, wherein the coupling member includes a coupling member shoulder adjacent and proximal of the teeth of the coupling member, wherein the interior surface includes a first shoulder adjacent and proximal of the teeth of the interior surface, and wherein the first shoulder engages the coupling member shoulder to prevent longitudinal movement of the coupling member in the housing in at least one direction.

27. The endoscope of claim 1, further comprising an insertion tube having an internal winding at a proximal end thereof, wherein the coupling member includes an external thread at a distal end thereof, and wherein the external thread threads onto the internal winding to secure the insertion tube to the coupling member.

28. The endoscope of claim 1, wherein the hoop comprises an inner diameter, wherein the distal annular shoulder comprises an outer diameter larger than the inner diameter, and wherein the hoop is sufficiently expandable to fit over the distal annular shoulder during assembly.

* * * * *